US011881617B2

(12) United States Patent
Kim et al.

(10) Patent No.: US 11,881,617 B2
(45) Date of Patent: Jan. 23, 2024

(54) ELECTRONIC DEVICE HAVING FLEXIBLE ANTENNA DISPOSED THEREON

(71) Applicant: Samsung Electronics Co., Ltd., Gyeonggi-do (KR)

(72) Inventors: Jaehyung Kim, Gyeonggi-do (KR); Hakjin Kim, Gyeonggi-do (KR); Minseok Park, Gyeonggi-do (KR); Hanbin Lee, Gyeonggi-do (KR); Sangmin Han, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 562 days.

(21) Appl. No.: 17/260,607

(22) PCT Filed: Sep. 19, 2019

(86) PCT No.: PCT/KR2019/012127
§ 371 (c)(1),
(2) Date: Jan. 15, 2021

(87) PCT Pub. No.: WO2020/060216
PCT Pub. Date: Mar. 26, 2020

(65) Prior Publication Data
US 2021/0273322 A1 Sep. 2, 2021

(30) Foreign Application Priority Data

Sep. 21, 2018 (KR) .................. 10-2018-0114047

(51) Int. Cl.
*H01Q 1/38* (2006.01)
*H04M 1/02* (2006.01)
*H01Q 1/24* (2006.01)

(52) U.S. Cl.
CPC .............. *H01Q 1/38* (2013.01); *H01Q 1/243* (2013.01); *H04M 1/0266* (2013.01)

(58) Field of Classification Search
CPC .......... H01Q 1/24; H01Q 1/241; H01Q 1/242; H01Q 1/243; H01Q 1/244; H01Q 1/36;
(Continued)

(56) References Cited

U.S. PATENT DOCUMENTS

| 8,688,179 B2 | 4/2014 | Choo et al. |
| 10,034,402 B2 | 7/2018 | Kiple et al. |

(Continued)

FOREIGN PATENT DOCUMENTS

| KR | 10-1240273 B1 | 2/2013 |
| KR | 10-2016-0097105 A | 8/2016 |

(Continued)

OTHER PUBLICATIONS

Korean Office Action dated Feb. 7, 2023.

*Primary Examiner* — Quochien B Vuong
(74) *Attorney, Agent, or Firm* — Cha & Reiter, LLC

(57) ABSTRACT

Disclosed is an electronic device including a housing including a front plate, a back plate facing in an opposite direction of the front plate, and a rear structure surrounding a space between the front plate and the back plate and including at least one opening, a display viewable through at least part of the front plate of the electronic device, a supporting member interposed between the display and the rear structure, at least one component interposed between the supporting member and the rear structure and at least partially overlapping with the opening when viewed from above the back plate, an antenna structure interposed between the supporting member and the rear structure, and a wireless communication circuit electrically connected to at least one of the first conductive pattern and/or the second conductive pattern and transmitting and/or receiving a signal having a specified frequency. The antenna structure includes a connection part at least partially overlapping with the opening, interposed between the component and the back plate, and including a (Continued)

first conductive pattern when viewed from above the back plate and a first portion connected to the connection part and including a second conductive pattern electrically connected to the first conductive pattern. Besides, various embodiments as understood from the specification are also possible.

15 Claims, 14 Drawing Sheets

(58) Field of Classification Search
CPC ........ H01Q 1/38; H04M 1/02; H04M 1/0202; H04M 1/026; H04M 1/0266
See application file for complete search history.

(56) References Cited

U.S. PATENT DOCUMENTS

| | | | |
|---|---|---|---|
| 10,224,632 B2 * | 3/2019 | Tenno | H01Q 7/06 |
| 10,231,352 B2 | 3/2019 | Woodhull et al. | |
| 10,411,327 B2 | 9/2019 | Kim et al. | |
| 10,454,154 B2 * | 10/2019 | Yeom | H01Q 1/38 |
| 10,461,400 B2 * | 10/2019 | Gang | H01Q 1/243 |
| 10,756,420 B2 * | 8/2020 | Kosaka | H01Q 13/10 |
| 10,854,954 B2 | 12/2020 | Dinh et al. | |
| 2009/0295650 A1 * | 12/2009 | Higaki | H01Q 1/243 |
| | | | 343/702 |
| 2015/0070219 A1 | 3/2015 | Dinh et al. | |
| 2018/0242470 A1 | 8/2018 | Kiple et al. | |

FOREIGN PATENT DOCUMENTS

| | | |
|---|---|---|
| KR | 10-2016-0105102 A | 9/2016 |
| KR | 10-2017-0035707 A | 3/2017 |
| KR | 10-2017-0055351 A | 5/2017 |
| KR | 10-2017-0083907 A | 7/2017 |

* cited by examiner

ELECTRONIC DEVICE HAVING FLEXIBLE ANTENNA DISPOSED THEREON

CROSS REFERENCE TO RELATED APPLICATIONS

This application is a National Phase Entry of PCT International Application No. PCT/KR2019/012127, which was filed on Sep. 19, 2019, and claims a priority to Korean Patent Application No. 10-2018-0114047, which was filed on Sep. 21, 2018, the contents of which are incorporated herein by reference.

TECHNICAL FIELD

Embodiments disclosed in this specification relate to a technology for arranging an antenna having flexibility inside an electronic device.

BACKGROUND ART

As mobile communication technologies develop, an electronic device that is equipped with an antenna is widely supplied. The electronic device may transmit and/or receive a radio frequency (RF) signal including a voice signal or data (e.g., a message, a photo, a video, a music file, or a game) by using the antenna.

In the meantime, the electronic device may have one or more components such as an ear jack, a speaker, a microphone, or a connector, inside the electronic device or on a side surface of the electronic device.

DISCLOSURE

Technical Problem

Nowadays, an electronic device is designed to have a thin thickness. At least part of components in the electronic device including a back plate may be disposed adjacent to a rear structure. When the rear structure is a one-piece unit connected from a side surface to a back surface, an antenna may not be positioned between the rear structure and a component disposed adjacent to the rear structure. When the antenna is disposed to bypass the component, the antenna may not satisfy the transmission efficiency for transmitting and/or receiving a signal.

Embodiments disclosed in the disclosure are to provide an electronic device equipped with at least part of an antenna that satisfies transmission and/or reception efficiency between a rear structure and a component disposed adjacent to the rear structure while including a back plate.

Technical Solution

According to an embodiment disclosed in the specification, an electronic device may include a housing including a front plate, a back plate facing in an opposite direction of the front plate, and a rear structure surrounding a space between the front plate and the back plate and including at least one opening, a display viewable through at least part of the front plate of the electronic device, a supporting member interposed between the display and the rear structure, at least one component interposed between the supporting member and the rear structure and at least partially overlapping with the opening when viewed from above the back plate, an antenna structure interposed between the supporting member and the rear structure, and a wireless communication circuit electrically connected to at least one of the first conductive pattern and/or the second conductive pattern and transmitting and/or receiving a signal having a specified frequency. The antenna structure may include a connection part at least partially overlapping with the opening, interposed between the component and the back plate, and including a first conductive pattern when viewed from above the back plate and a first portion connected to the connection part and including a second conductive pattern electrically connected to the first conductive pattern.

Furthermore, according to an embodiment disclosed in the specification, an electronic device may include one or more components disposed, on a side surface of the electronic device or inside the electronic device, a rear structure forming the side surface and a back surface of the electronic device and mounting the components, a back plate disposed outside the rear structure, an antenna structure disposed inside the rear structure, a PCB including at least one pattern connection part connected to the antenna structure, and one or more processors operatively connected to the PCB. The rear structure may have at least one opening in a region overlapping with one component of the one or more components in a first direction. The antenna structure may include a connection part interposed between the one component and the back plate while crossing the at least one opening in a second direction different from the first direction and may radiate a signal of a specified frequency depending on an electrical length of the antenna structure implemented by using the connection part.

Moreover, according to an embodiment disclosed in the specification, an electronic device may include one or more components disposed on a side surface of the electronic device or inside the electronic device, a rear structure forming the side surface and a back surface of the electronic device and mounting the one or more components, a back plate disposed outside the rear structure, and an antenna structure covering an internal lower surface and an internal side surface of the rear structure and having at least one hole structure at a portion corresponding to the one or more components. The rear structure may have at least one opening disposed adjacent to one component among the one or more components. The antenna structure may have a connection part disposed to at least partially overlap with the opening and a first portion electrically connected to one side of the connection part.

Advantageous Effects

According to embodiments disclosed in this specification, an antenna may be designed while the thickness of an electronic device including a back plate is reduced.

Furthermore, according to embodiments disclosed in this specification, the radiation performance of an antenna of an electronic device may be improved.

Besides, a variety of effects directly or indirectly understood through the specification may be provided.

With regard to description of drawings, the same or similar components will be marked by the same or similar reference signs.

MODE FOR INVENTION

Hereinafter, various embodiments of the disclosure may be described with reference to accompanying drawings. However, it should be understood that this is not intended to limit the disclosure to specific implementation forms and includes various modifications, equivalents, and/or alternatives of embodiments of the disclosure.

Figure 1:
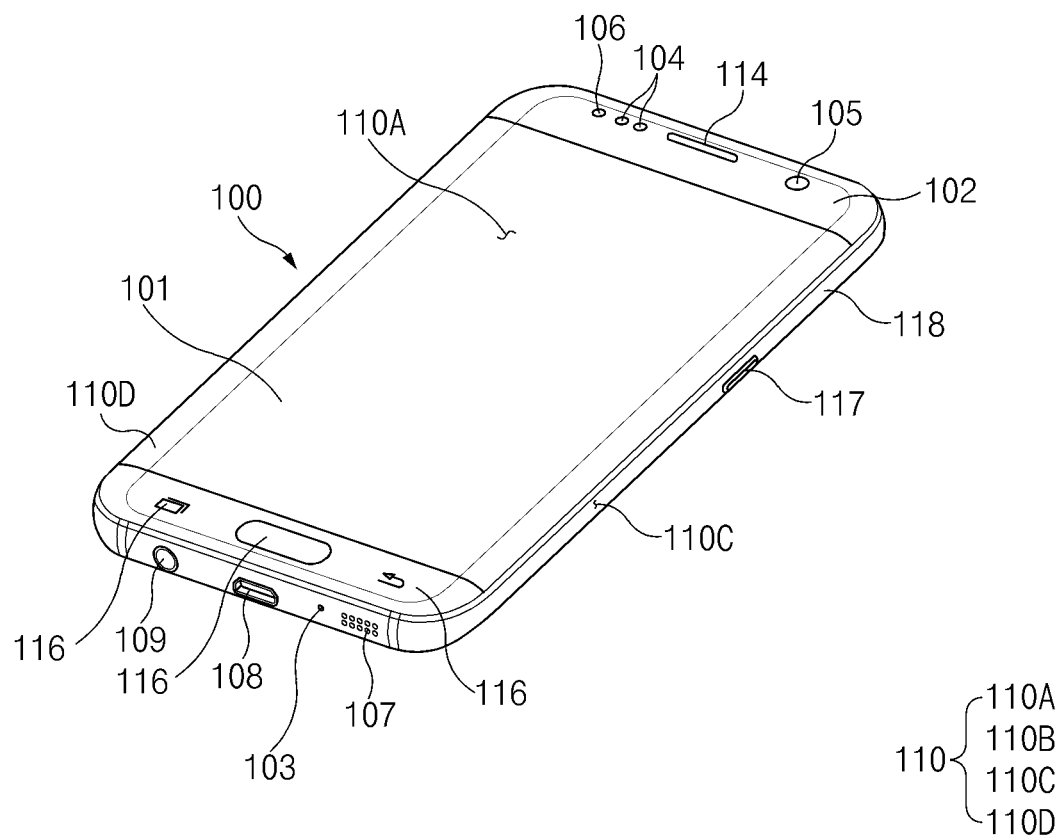
FIG. 1 is a perspective view of a front surface of an electronic device according to an embodiment.
Figure 2:
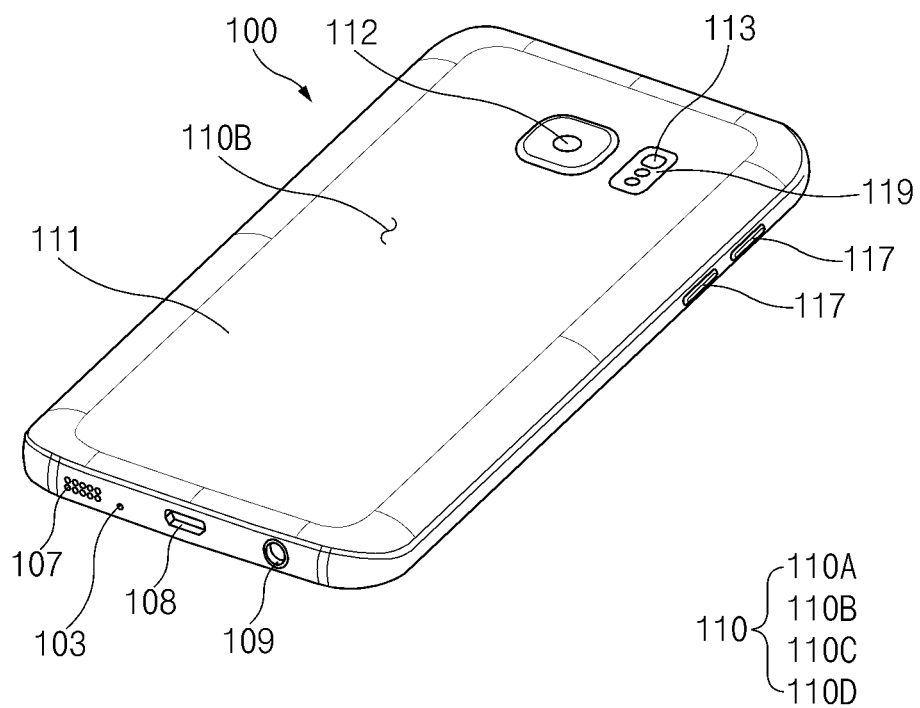
FIG. 2 is a perspective view of a back surface of an electronic device 100 of FIG. 1.

FIG. 1 is a perspective view of a front surface of an electronic device 100 according to an embodiment. FIG. 2 is a perspective view of a back surface of the electronic device 100 of FIG. 1.

Referring to FIGS. 1 and 2, the electronic device 100 according to an embodiment may include a housing 110 including a first surface (or a front surface) 110A, a second surface (or a back surface) 110B, and a side surface 110C surrounding a space between the first surface 110A and the second surface 110B. In another embodiment (not illustrated), the housing may refer to a structure for forming a part of the first surface 110A, the second surface 110B, and the side surfaces 110C of FIG. 1. According to an embodiment, the first surface 110A may be formed by a first plate (or a front plate) 102 (e.g., a glass plate including various coating layers, or a polymer plate), at least part of which is substantially transparent. The second surface 110B may be formed by a rear plate 111 that is substantially opaque. For example, the rear plate 111 may be implemented with a coated or colored glass, a ceramic, a polymer, a metal (e.g., aluminum, stainless steel (STS), or magnesium), or the combination of at least two of the materials. The side surface 110C may be coupled to the front plate 102 or the back plate 111 and may be implemented with a side bezel structure (or a "side member") 118 including metal and/or polymer. In an embodiment, the back plate 111 and the side bezel structure 118 may be integrally formed and may include the same material (e.g., a metal material such as aluminum).

According to an embodiment, the electronic device 100 may include at least one or more of a display 101, an audio module (103, 107, 114), a sensor module (104, 116, 119), a camera module (105, 112, 113), a key input device 117, a light-emitting device 106, and a connector hole (108, 109). In an embodiment, the electronic device 100 may not include at least one (e.g., the key input device 117 or the light-emitting device 106) of the components or may further include any other component.

For example, the display 101 may be exposed through an upper portion of the front plate 102. In an embodiment, at least part of the display 101 may be exposed through the first surface 110A and the front plate 102 forming the first regions 110D of the side surface 110C. In an embodiment, a corner of the display 101 may be formed to be mostly identical to a shape of an outer portion of the front plate 102 adjacent thereto. In another embodiment (not illustrated), to increase an area where the display 101 is exposed, a gap between the outer portion of the display 101 and an outer portion of the front plate 102 may be formed mostly identically.

In another embodiment (not illustrated), a recess or an opening may be formed at a portion of a screen display region of the display 101, and at least one or more of the audio module 114, the sensor module 104, the camera module 105, and the light-emitting device 106 may be provided to be aligned with the recess or the opening. In another embodiment (not illustrated), at least one or more of the audio module 114, the sensor module 104, the camera module 105, the fingerprint sensor 116, and the light-emitting device 106 may be provided on a back surface of the screen display region of the display 101. In another embodiment (not illustrated), the display 101 may be coupled to a touch sensing circuit, a pressure sensor capable of measuring the intensity (or pressure) of a touch, and/or a digitizer capable of detecting a magnetic stylus pen or may be disposed adjacent thereto.

The audio module (103, 107, 114) may include the microphone hole 103 and the speaker hole (107, 114). The microphone for obtaining external sound may be disposed within the microphone hole 103; in an embodiment, a plurality of microphones may be disposed to detect a direction of sound. The speaker hole (107, 114) may include the external speaker hole 107 and the receiver hole 114 for making a call. In an embodiment, the speaker hole (107, 114) and the microphone hole 103 may be implemented with one hole, or a speaker (e.g., a piezo speaker) may be included without the speaker hole (107, 114).

The sensor module (104, 116, 119) may generate an electrical signal or a data value corresponding to an internal operation state of the electronic device 100 or corresponding to an external environment state. The sensor module (104, 116, 119) may include, for example, the first sensor module 104 (e.g., a proximity sensor) and/or a second sensor module 116 (not illustrated) (e.g., a fingerprint sensor) disposed on the first surface 110A of the housing 110, and/or the third sensor module 119 (e.g., a heart rate monitor (HRM) sensor) disposed on the second surface 110B of the housing 110. The fingerprint sensor may be positioned on the second surface 110B as well as the first surface 110A (e.g., the display 101) of the housing 110. The electronic device 100 may further include a sensor module not illustrated, for example, at least one of a gesture sensor, a gyro sensor, a barometric pressure sensor, a magnetic sensor, an acceleration sensor, a grip sensor, a color sensor, an infrared (IR) sensor, a biometric sensor, a temperature sensor, a humidity sensor, or the illumination sensor 104.

The camera module (105, 112, 113) may include the first camera device 105 disposed on the first surface 110A of the electronic device 100, and the second camera device 112 and/or the flash 113 disposed on the second surface 110B. The camera devices 105 and 112 may include one or more lenses, an image sensor, and/or an image signal processor. The flash 113 may include, for example, a light-emitting diode or a xenon lamp. In an embodiment, two or more lenses (e.g., an infrared camera and wide-angle and telephoto lenses) and image sensors may be disposed on one surface of the electronic device 100.

The key input device 117 may be disposed on the side surface 110C of the housing 110. In another embodiment, the electronic device 100 may not include all or a part of the key input devices 117, and the key input device 117 not included may be implemented on the display 101 in the form of a soft key. In an embodiment, the key input device may include the sensor module 116 disposed on the first surface 110A of the housing 110.

The light-emitting device 106 may be disposed, for example, on the first surface 110A of the housing 110. The light-emitting device 106 may provide status information of the electronic device 100, for example, in the form of light. In another embodiment, the light-emitting device 106 may provide, for example, a light source that operates in conjunction with an operation of the camera module 105. The light-emitting device 106 may include, for example, a light-emitting diode (LED), an IR LED, and a xenon lamp.

The connector hole (108, 109) may include the first connector hole 108 capable of accommodating a connector (e.g., a USB connector) for transmitting/receiving a power and/or data with an external electronic device, and/or the second connector hole 109 (or an earphone jack) capable of accommodating a connector for transmitting/receiving an audio signal with the external electronic device.

Figure 3:
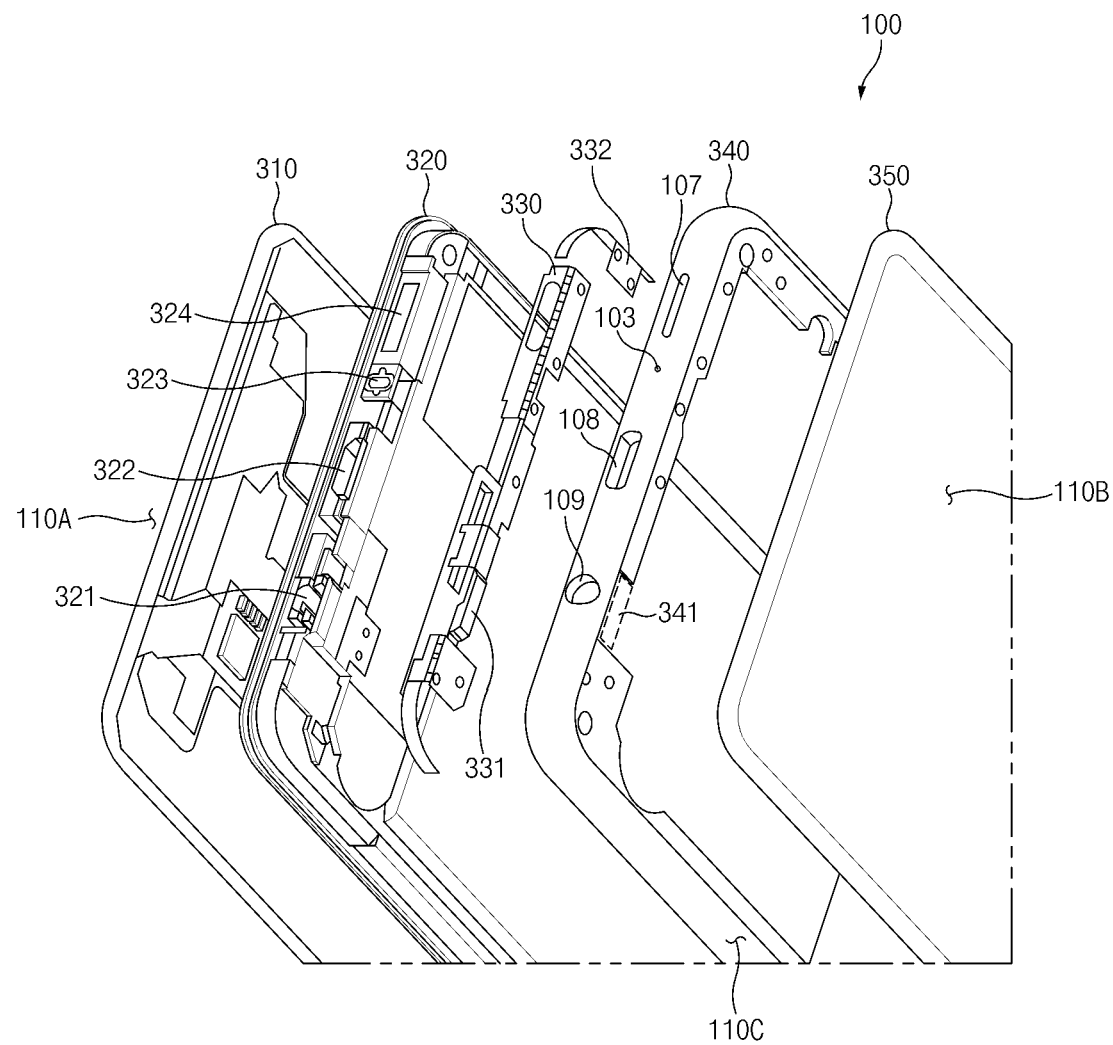
FIG. 3 is an exploded perspective view of an electronic device according to an embodiment.

FIG. 3 is an exploded perspective view of the electronic device 100 according to an embodiment. According to an embodiment, the electronic device 100 may include at least one of a display 310 (e.g., the display 101 in FIG. 1), a supporting member 320, a first antenna structure 330, a second antenna structure 332, a rear structure 340, and a back plate 350 (the back plate 111 of FIG. 2). In an embodiment, the rear structure 340 may include the side member 118 of FIG. 2.

In an embodiment, the display 310 may be exposed to the front surface 110A through an upper portion of the front plate 102. The display 310 may display an execution screen of an application activated in the electronic device 100.

In an embodiment, the supporting member 320 may be disposed on one surface of the display 310. The supporting member 320 may be attached to a surface on which a display panel in the display 310 is disposed. At least part of the supporting member 320 may be formed of a metal material and/or a polymer material. At least part of a mounting structure of parts included in the electronic device 100 may be formed in the supporting member 320.

In an embodiment, at least one of components 321 to 324 may be disposed on at least part of one surface of the supporting member 320. The components 321 to 324 may be components necessary for performing an operation of the electronic device 100 or for inputting/outputting information, respectively. For example, the components 321 to 324 may be the ear jack 321, the connector 322, the speaker 323, the microphone module 324, or a communication module, respectively.

In an embodiment, the first antenna structure 330 may be disposed on one side of the supporting member 320. The first antenna structure 330 may be disposed on an edge of at least one side of the supporting member 320. At least part of the first antenna structure 330 may be disposed on an upper portion of at least one of the components 321 to 324. The first antenna structure 330 may be disposed inside the rear structure 340. At least part of the first antenna structure 330 may be formed of a material having flexibility. For example, at least part of the first antenna structure 330 may be formed of a flexible printed circuit board (FPCB). The first antenna structure 330 may radiate a signal of a first frequency.

In an embodiment, the second antenna structure 332 may be spaced from the first antenna structure 330 by a predetermined distance. The second antenna structure 332 may be disposed on one side of the supporting member 320. The second antenna structure 332 may be disposed in at least part of an edge adjacent to an edge at which the first antenna structure 330 is disposed. The second antenna structure 332 may be disposed inside the rear structure 340. The second antenna structure 332 may radiate a signal of a second frequency.

In an embodiment, the rear structure 340 may be coupled to the supporting member 320. The first antenna structure 330 may be interposed between the rear structure 340 and the supporting member 320. The rear structure 340 may include a non-conductive material, and the side surface 110C and the back surface 110B may be formed integrally.

In an embodiment, the rear structure 340 may form the side surface 110C and the back surface 110B of the electronic device 100. The rear structure 340 may mount at least one of the components 321 to 324. The rear structure 340 may expose at least part of the components 321 to 324. For example, the rear structure 340 may include the connector holes 108 and 109 for exposing at least part of the ear jack 321 or the connector 322, the speaker hole 107 for exposing at least part of the speaker 323, or the microphone hole 103 for exposing at least part of the microphone 324. The rear structure 340 may provide a physical structure in which at least one of the components 321 to 324 is capable of inputting/outputting information with the outside or is capable of being connected to an external device.

In an embodiment, the rear structure 340 may have at least one opening 341. The at least one opening 341 may be arranged in a first direction, which is a direction from the rear structure 340 to the back plate 350. When viewed from above the back plate 350, at least part of the at least one opening 341 may be disposed to overlap with at least one of the components 321 to 324. For example, the at least one opening 341 may be disposed at a location at which the at least one opening 341 at least partially overlaps with the first component 321. The first component 321 may be an ear jack. In an embodiment, when viewed from above the back plate 350, at least part of the first antenna structure 330 may overlap with the at least one opening 341.

In an embodiment, the back plate 350 may be coupled to the rear structure 340. The back plate 350 may be disposed on the outermost edge of the back surface 110B of the electronic device 100. The back plate 350 may protect the electronic device 100 from external impacts or foreign objects.

Figure 4:
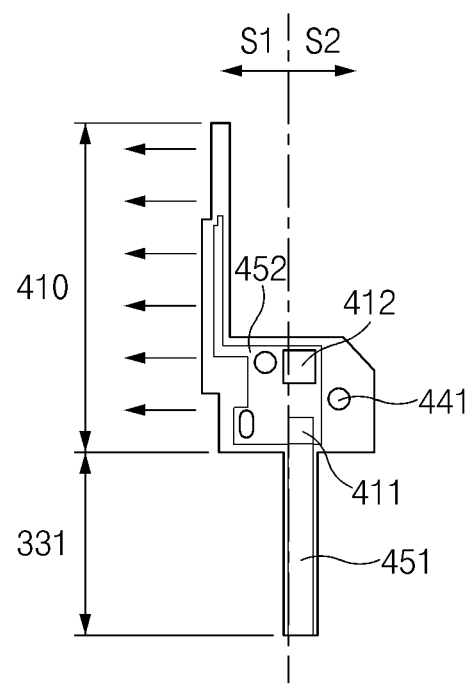
FIG. 4 is a view illustrating a first antenna structure of an electronic device according to an embodiment.

FIG. 4 is a view illustrating the first antenna structure 330 of the electronic device 100 according to an embodiment. In this specification, an antenna may include the first antenna structure 330.

In an embodiment, the first antenna structure 330 may be formed in structure or shape the same as an FPCB. The FPCB may include an insulating layer and a conductive layer. For example, the FPCB may have a structure in which the conductive layer is disposed in the middle thereof and in which insulating layers for protecting the conductive layer are disposed in directions of the front surface 110A and the back surface 110B of the electronic device 100 with the conductive layer therebetween.

In an embodiment, the first antenna structure 330 may include at least one of a connection part 331 and a first portion 410. The first antenna structure 330 may be divided into a first region S1 and a second region S2 depending on a direction in which the first antenna structure 330 is disposed, or depending on a surface to which the first antenna structure 330 is attached.

In an embodiment, the first region S1 may be disposed to face the side surface 110C of the electronic device 100. In an embodiment, the second region S2 may be disposed to face the front surface 110A or the back surface 110B of the electronic device 100. The second region S2 may be fixed to the rear structure 340. The second region S2 may be connected to a PCB 510.

In an embodiment, the connection part 331 may be connected to one side of the first portion 410. When viewed from above the back plate 350, the connection part 331 may be disposed at a location at which the connection part 331 overlaps with at least part of the opening 341 of the rear structure 340. When viewed from above the back plate 350, at least part of the connection part 331 may be disposed to overlap with at least one of the components 321 to 324. For example, when viewed from above the back plate 350, the connection part 331 may be disposed at a location at which the connection part 331 overlaps with at least partially with the first component 321. For example, the first component 321 may be an ear jack.

In an embodiment, the first antenna structure 330 may include a first fixing part 411. The first fixing part 411 may be disposed to be adjacent to a boundary line between the connection part 331 and the first portion 410. The first fixing part 411 may allow the connection part 331 to be fixed on the opening 341 of the rear structure 340.

In an embodiment, the first portion 410 may include a pattern connection part 412. The pattern connection part 412 may include a feed part, a ground part, or a switch ground part. The pattern connection part 412 may be a point for connecting the first portion 410 to the PCB 510. The pattern connection part 412 may be a portion in which at least part of a film layer of the FPCB is removed to expose a conductive layer. The pattern connection part 412 may be electrically connected to the PCB 510 through a connection member such as a C-clip.

In an embodiment, the connection part 331 and the first portion 410 may include a first conductive pattern 451 and a second conductive pattern 452, respectively. The first conductive pattern 451 may be disposed on at least part of the connection part 331. The second conductive pattern 452 may be disposed on at least part of the first portion 410. The second conductive pattern 452 may be mainly disposed in the first region S1. In an embodiment, the first conductive pattern 451 and the second conductive pattern 452 may be electrically connected to each other to form one antenna radiator.

In an embodiment, the first portion 410 may include a guide groove 441. The guide groove 441 may couple the antenna structure 330 to the rear structure 340. When the rear structure 340 is formed, a flowing material forming the rear structure 340 may be injected. The guide groove 441 may be filled with the flowing material forming the rear structure 340. Accordingly, a guide pillar of the rear structure 340 may be formed along the guide groove 441. The first antenna structure 330 and the rear structure 340 may be coupled to each other by using the guide pillar. As compared to a case where only an adhesive layer is interposed between the first antenna structure 330 and the rear structure 340, an error occurring during a coupling and attaching operation between the first antenna structure 330 and the rear structure 340 may be reduced when a guide pillar corresponding to the guide groove 441 is used. Accordingly, the coupling between the first antenna structure 330 and the rear structure 340 may be made precisely.

Figure 5:
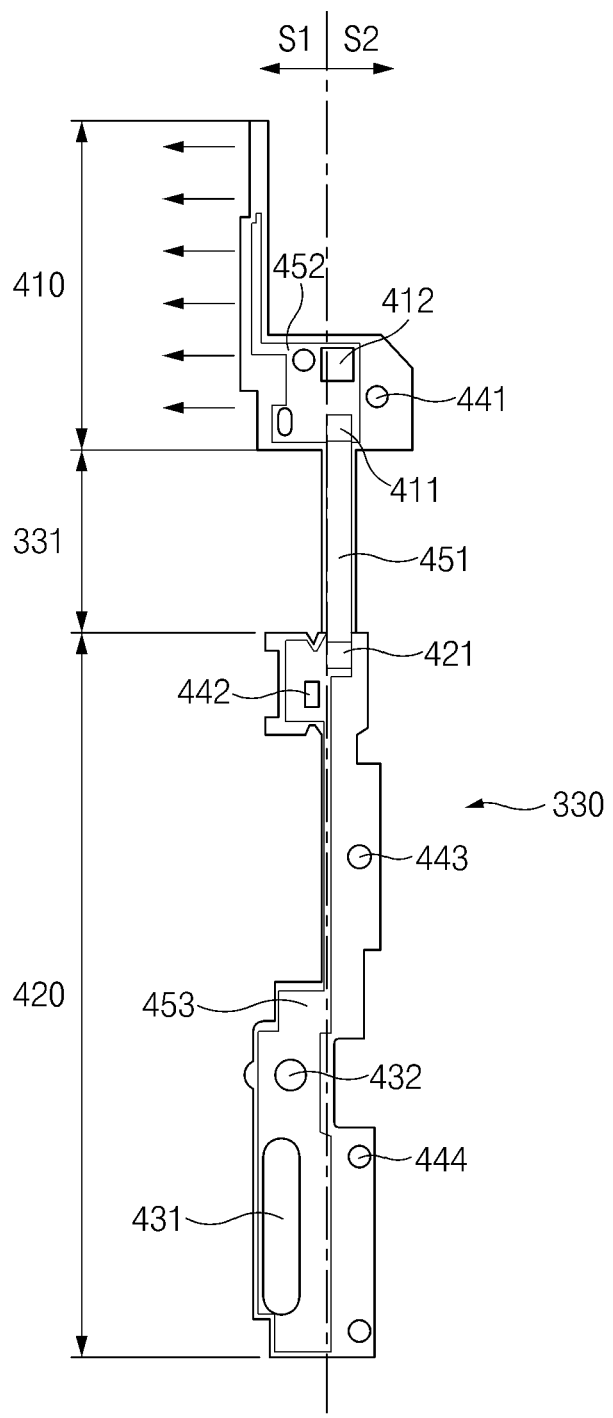
FIG. 5 is a view illustrating a first antenna structure of an electronic device according to another embodiment.

FIG. 5 is a view illustrating a first antenna structure 530 of the electronic device 100 according to another embodiment. In this specification, the first antenna structure 530 according to another embodiment may include the same component as the first antenna structure 330 described with reference to FIG. 4. Hereinafter, a description on the same component as the first antenna structure 330 described with reference to FIG. 4 will be omitted, and only the added component will be described.

In an embodiment, as illustrated in FIG. 5, the first antenna structure 530 may include at least one of the connection part 331, the first portion 410, and a second portion 420. For example, as compared to the first antenna structure 330 of FIG. 4, the first antenna structure 530 of FIG. 5 may further include the second portion 420.

In an embodiment, the connection part 331 may connect the first portion 410 to the second portion 420.

In an embodiment, the second portion 420 of the first antenna structure 530 may include a second fixing part 421. The second fixing part 421 may be disposed to be adjacent to a boundary line between the connection part 331 and the second portion 420. The second fixing part 421 may allow the connection part 331 to be fixed on the opening 341 of the rear structure 340.

In an embodiment, the second portion 420 may further include a third conductive pattern 453. The third conductive pattern 453 may be disposed in at least part of the second portion 420. The third conductive pattern 453 may be mainly disposed in the first region S1. In an embodiment, at least two of the first conductive pattern 451, the second conductive pattern 452, and the third conductive pattern 453 may be electrically connected to each other to form one antenna radiator.

In an embodiment, the second portion 420 in the first antenna structure 530 may be disposed in a region adjacent to one or more components 321 to 324. For example, when the components 321 to 324 such as the ear jack 321, the connector 322, the speaker 323, the microphone 324, or a communication module are disposed inside the electronic device 100 to be adjacent to the first antenna structure 530, it may not be easy to mount the second portion 420 included in the first antenna structure 530 inside the electronic device 100. The second portion 420 may be formed of an FPCB capable of easily designing a shape. The second portion 420 may arbitrarily form a pattern with a thickness that is not greater than a specified thickness. For example, the second portion 420 may be disposed to form the third conductive pattern 453 in an outer region other than the speaker hole 107.

In an embodiment, the second portion 420 may include at least one hole structure 431 or 432. For example, the second portion 420 may include a speaker through-hole 431 through which a sound is capable of being outputting from the speaker 323 or a microphone hole 432 capable of delivering a voice to the microphone module 324. The second portion 420 may arrange the third conductive pattern 453 at a periphery of the hole structures 431 and 432, thereby forming an antenna radiator. An electrical length of the first antenna structure 530 may not be reduced due to the hole structures 431 and 432. Accordingly, while a radiation region of the first antenna structure 530 is not reduced, it is possible to output a speaker sound or to enter a sound into a microphone. Moreover, the first antenna structure 530 may substantially transmit and receive a signal of a specified frequency.

In an embodiment, the second portion 420 may include one or more guide grooves 442 to 444. The guide grooves 442 to 444 may couple the antenna structure 530 to the rear structure 340. When the rear structure 340 is formed, a flowing material forming the rear structure 340 may be injected. The guide grooves 442 to 444 may be filled with the flowing material forming the rear structure 340. Accordingly, a guide pillar of the rear structure 340 may be formed along the guide grooves 442 to 444. The first antenna structure 530 and the rear structure 340 may be coupled to each other by using the guide pillar. As compared to a case where only an adhesive layer is interposed between the first antenna structure 530 and the rear structure 340, an error occurring during a coupling and attaching operation between the first antenna structure 530 and the rear structure 340 may be reduced when a guide pillar corresponding to the guide grooves 442 to 444 is used. Accordingly, the coupling between the first antenna structure 530 and the rear structure 340 may be made precisely.

In this specification, the first antenna structure 330 described with reference to FIG. 4 may perform the same function as the first antenna structure 530 of FIG. 5. Besides, in this specification, the first antenna structure 330 described with reference to FIG. 4 may be replaced with the first antenna structure 530 of FIG. 5.

Figure 6:
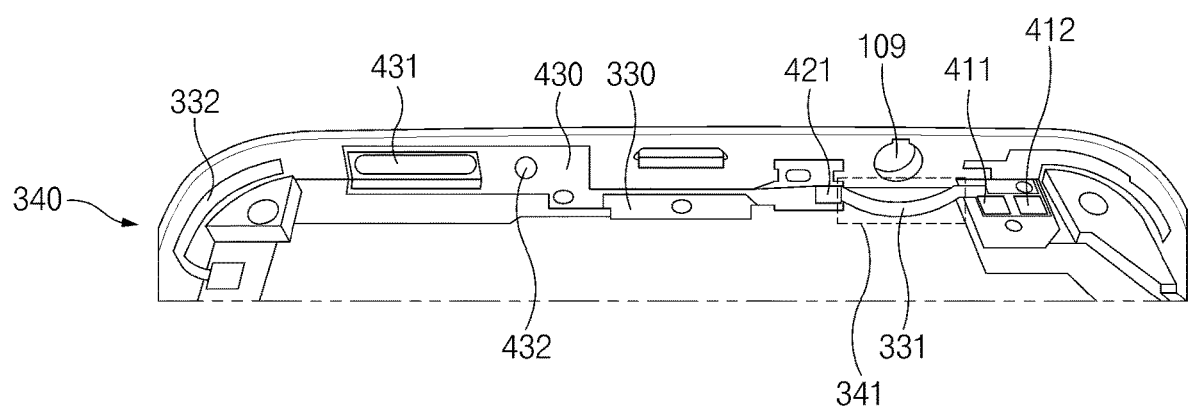
FIG. 6 is a view illustrating that a first antenna structure and a second antenna structure of an electronic device are coupled to a rear structure according to an embodiment.

FIG. 6 is a view illustrating that the first antenna structure 330 and the second antenna structure 332 of the electronic device 100 are coupled to the rear structure 340 according to an embodiment. In this specification, an antenna may include at least one of the first antenna structure 330 and/or the second antenna structure 332.

In an embodiment, the first antenna structure 330 may be disposed at an edge of at least one side of the rear structure 340. The second antenna structure 332 may be spaced from the first antenna structure 330 by a predetermined distance and may be disposed on at least part of an edge of the other side of the rear structure 340.

In an embodiment, the first antenna structure 330 may be disposed at a location at which the at least one opening 341 corresponds to the connection part 331. The connection part 331 may be disposed to cross the at least one opening 341.

In an embodiment, when the first antenna structure 330 is formed of an FPCB, the connection part 331 may also be formed of an FPCB.

In an embodiment, the first antenna structure 530 may have the first fixing part 411 and the second fixing part 421. The first fixing part 411 and the second fixing part 421 may be disposed at opposite ends of the connection part 331. The first fixing part 411 and the second fixing part 421 may support the opposite ends of the connection part 331. The first fixing part 411 and the second fixing part 421 may perform a function such as an arch-shaped bridge that allows the connection part 331 to maintain an arched shape.

In an embodiment, the first antenna structure 330 may include a third fixing part 430. The third fixing part 430 may be disposed in the second portion 420. The third fixing part 430 may fix the first antenna structure 330 to the side surface 110C.

Figure 7:
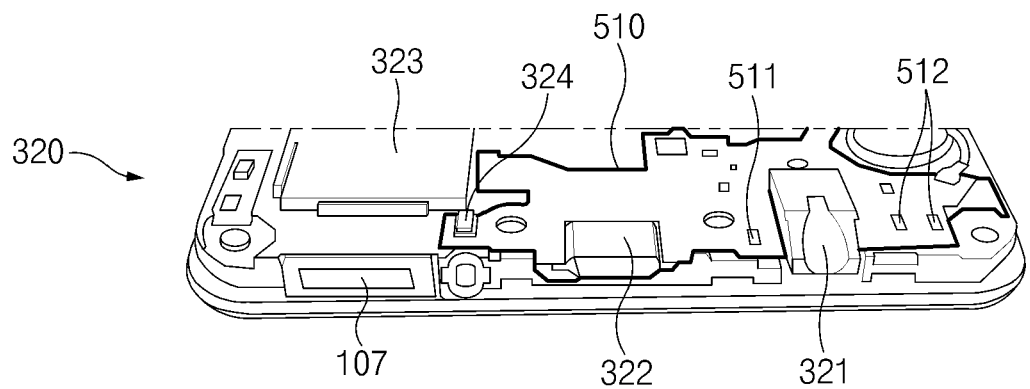
FIG. 7 is a view illustrating a supporting member and a PCB of an electronic device according to an embodiment.

FIG. 7 is a view illustrating the supporting member 320 and the PCB 510 of the electronic device 100 according to an embodiment.

In an embodiment, the PCB 510 may be disposed on at least part of one surface of the supporting member 320. The PCB 510 may include a ground of the first antenna structure 330. Circuits capable of controlling an operation of at least one of the components 321 to 324 may be disposed on the PCB 510.

In an embodiment, the PCB 510 may include a first pattern connection part 511 and a second pattern connection part 512. The first pattern connection part 511 may be connected to the second fixing part 421 of the first antenna structure 330. The first pattern connection part 511 may connect the second fixing part 421 to a ground layer of the PCB 510. The second pattern connection part 512 may be connected to the pattern connection part 412 of the first antenna structure 330. The second pattern connection part 512 may feed the first antenna structure 330 by using the pattern connection part 412.

In an embodiment, the first antenna structure 330 may radiate a signal of a specified frequency by feeding the second pattern connection part 512. The first antenna structure 330 may radiate signals of one or more frequencies by using one or more electrical paths. For example, the first antenna structure 330 may radiate the signal of the first frequency from the second pattern connection part 512 by using a first electrical path including a second conductive pattern. For another example, the first antenna structure 330 may radiate the signal of the second frequency from the second pattern connection part 512 by using a second electrical path including a third conductive pattern.

Figure 8:
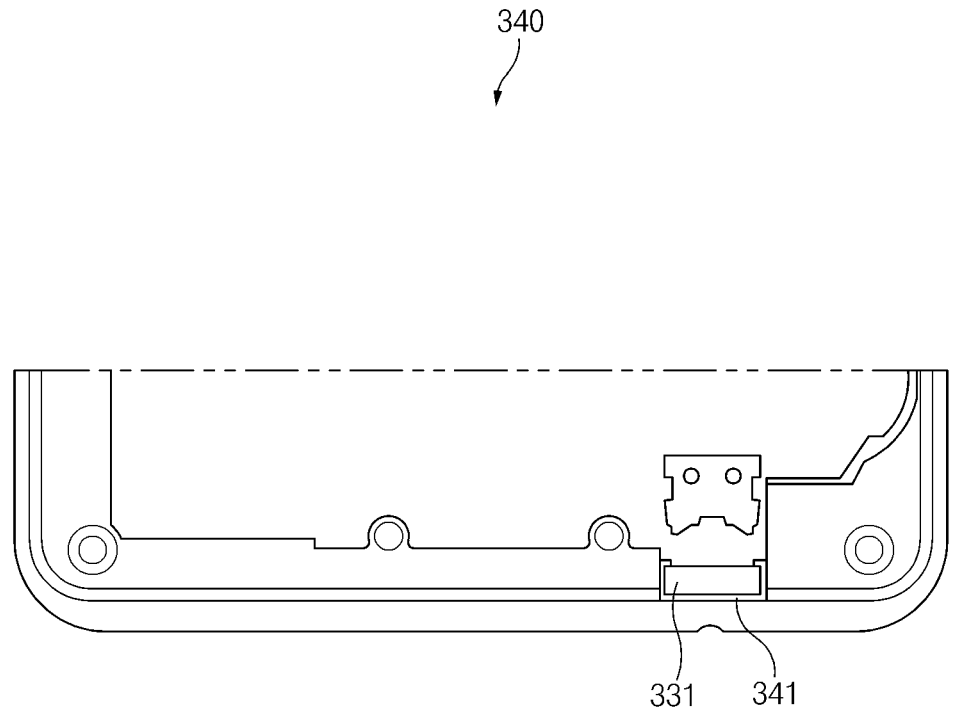
FIG. 8 is a view illustrating a rear structure, an opening, and a connection part of an electronic device according to an embodiment.

FIG. 8 is a view illustrating the rear structure 340, the opening 341, and the connection part 331 of the electronic device 100 according to an embodiment. FIG. 8 shows a structure in which the back plate 350 is removed from the back surface 110B of the electronic device 100.

In an embodiment, the rear structure 340 may have the at least one opening 341. For example, when viewed from above the back plate 350, the at least one opening 341 may be formed in a region at least partially overlapping with at least one of the components 321 to 324 of the rear structure 340.

In an embodiment, the connection part 331 may be disposed to cross the opening 341.

In an embodiment, when viewed from above the back plate 350, the connection part 331 may be disposed to overlap with at least one of the components 321 to 324.

Figure 9:
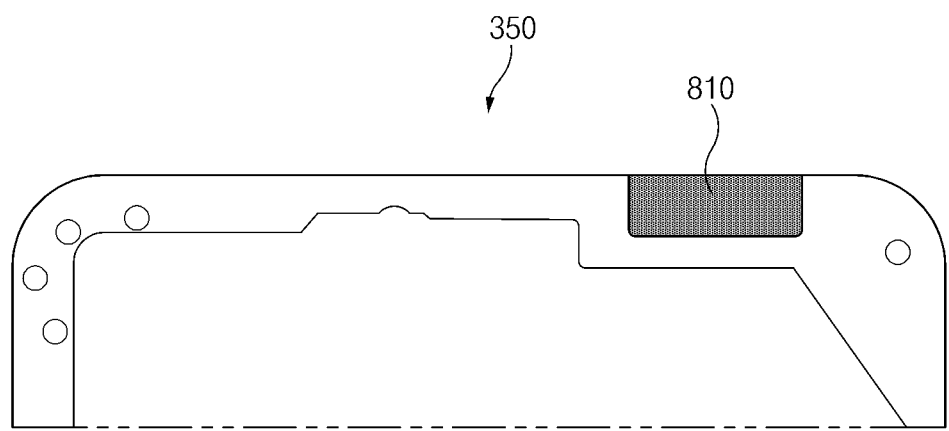
FIG. 9 is a view illustrating a back plate and a reinforcement member of an electronic device according to an embodiment.

FIG. 9 is a view illustrating the back plate 350 and a reinforcement member 810 of the electronic device 100 according to an embodiment.

In an embodiment, the back plate 350 may be attached to one surface of the rear structure 340. For example, the back plate 350 may be attached to a back surface of the rear structure 340. In this case, an edge region of the back plate 350 may have a shape corresponding to an edge region of the back surface of the rear structure 340. The back plate 350 may be coupled to the back surface of the rear structure 340 and may be disposed on the back surface of the rear structure 340. The back plate 350 may absorb impacts applied from the back surface of the rear structure 340, thereby enhancing durability of the electronic device 100.

In an embodiment, the back plate 350 may further include the reinforcement member 810. The reinforcement member 810 may be disposed on at least part of one surface of the back plate 350 facing the rear structure 340. The reinforcement member 810 may be disposed to correspond to the opening 341 of the rear structure 340. The reinforcement member 810 may be formed of a material capable of absorbing impacts. For example, the reinforcement member 810 may be formed of a foam material that absorbs impacts while the volume of the foam material is reduced when the foam material has impacted.

In an embodiment, a uniform gap between the back plate 350 and the first portion 410 of the first antenna structure 330 or the second portion 420 of the first antenna structure 330 may be maintained by means of the reinforcement member 810. While maintaining a uniform distance from the components 321 to 324, for example, the ear jack 321, the connection part 331 of the first antenna structure 330 may be fixed to a specified location by means of the reinforcement member 810.

In an embodiment, when the back plate 350 is formed of a transparent material such as glass, the reinforcement member 810 may prevent the first portion 410 or the second portion 420 from being exposed to the outside. The reinforcement member 810 may prevent the radiation performance of the first portion 410 or the second portion 420 from being changed due to the characteristics of a material forming the back plate 350.

In an embodiment, when viewed from above the back plate 350, at least part of the reinforcement member 810 may overlap with the at least one opening 341. For example, the reinforcement member 810 may cover the connection part 331. The reinforcement member 810 may have a specified thickness. The reinforcement member 810 may support or fix the connection part 331 in a specified shape such that the connection part 331 is stabilized on the at least one opening 341.

Figure 10:
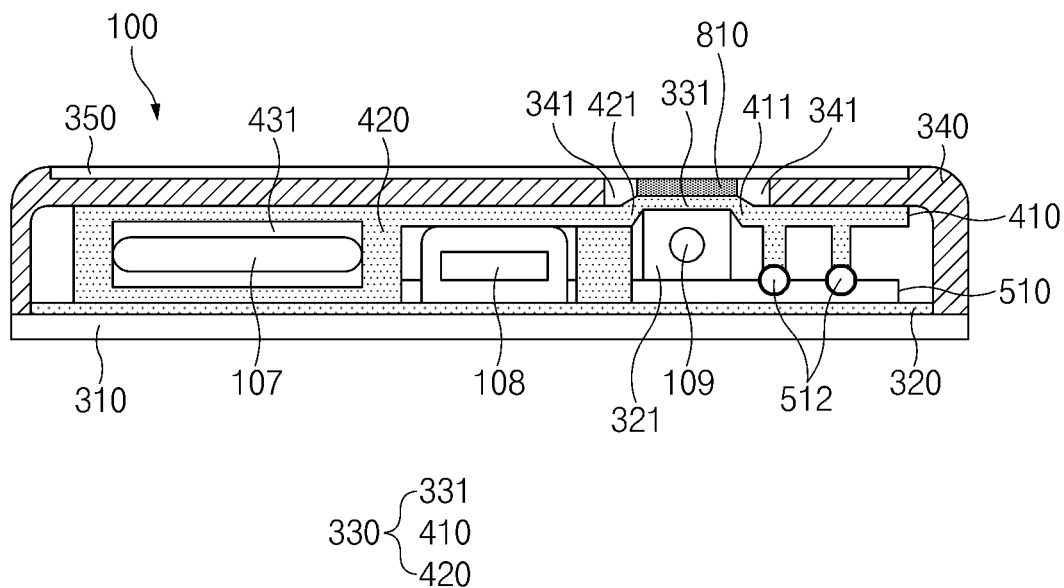
FIG. 10 is a view illustrating a side surface of an electronic device according to an embodiment.

FIG. 10 is a view illustrating the side surface 110C of the electronic device 100 according to an embodiment.

In an embodiment, the display 310 may be disposed on the front surface 110A of the electronic device 100. The display 310 may display an execution screen of an application running in the electronic device 100.

In an embodiment, the supporting member 320 may be disposed on the back surface of the display 310. The supporting member 320 may mount at least one of the PCB 510 and the components 321 to 324.

In an embodiment, the first antenna structure 330 may be mounted between the supporting member 320 and the rear structure 340. For example, at least part of the first antenna structure 330 may be disposed to face one surface of the rear structure 340; at least another part of the first antenna structure 330 may be disposed to face at least part of the side surface of the rear structure 340. In an embodiment, at least part of the first antenna structure 330 may be formed of an FPCB.

In an embodiment, the first antenna structure 330 may include the connection part 331. The connection part 331 may be disposed to at least partially overlap with at least one opening 341 formed in the rear structure 340. The connection part 331 may be disposed to be adjacent to at least one of the components 321 to 324. For example, the connection part 331 may be disposed to cross the back surface of the connector hole 109 of the first component 321 (e.g., an ear jack).

In an embodiment, the first antenna structure 330 may include the first fixing part 411 and the second fixing part 421. The first fixing part 411 and the second fixing part 421 may be connected to opposite ends of the connection part 331. The first fixing part 411 and the second fixing part 421 may be electrically connected to the PCB 510. For example, the first fixing part 411 may be connected to the first pattern connection part (e.g., the first pattern connection part 511 of FIG. 7) of the PCB 510. The second fixing part 421 may be connected to the second pattern connection part 512 of the PCB 510.

In an embodiment, the first antenna structure 330 may include the second portion 420. The second portion 420 may be disposed to face at least part of the side surface of the rear structure 340. The second portion 420 may include at least one hole structure 431. When viewed from above the side surface of the rear structure 340, the at least one hole structure 431 may overlap with at least one of speaker hole 107 and the connector holes 108 and 109.

In an embodiment, the rear structure 340 may form at least part of the side surface 110C and the back surface 110B of the electronic device 100. The rear structure 340 may mount the first antenna structure 330. For example, the rear structure 340 may mount the first antenna structure 330 on at least part of an edge of one surface of the rear structure 340 and at least part of one side surface of the rear structure 340.

In an embodiment, the rear structure 340 may include the at least one opening 341. The at least one opening 341 may penetrate the rear structure 340 in a first direction that is a thickness direction or a height direction of the electronic device 100. When viewed from above the back plate 350, the at least one opening 341 may be disposed to at least partially overlap with at least one (e.g., ear jack 321) of the components 321 to 324.

In an embodiment, the back plate 350 may be disposed on the back surface of the rear structure 340. The back plate 350 may include the reinforcement member 810. The reinforcement member 810 may be interposed between the back plate 350 and the opening 341. For example, when viewed from above the back plate 350, the reinforcement member 810 may be disposed to overlap with at least one opening 341. The reinforcement member 810 may support the connection part 331 such that the connection part 331 is capable of maintaining the shape thereof. In an embodiment, the reinforcement member 810 may include an adhesive member such that the connection part 331 is capable of being attached to the back plate 350.

Figure 11:
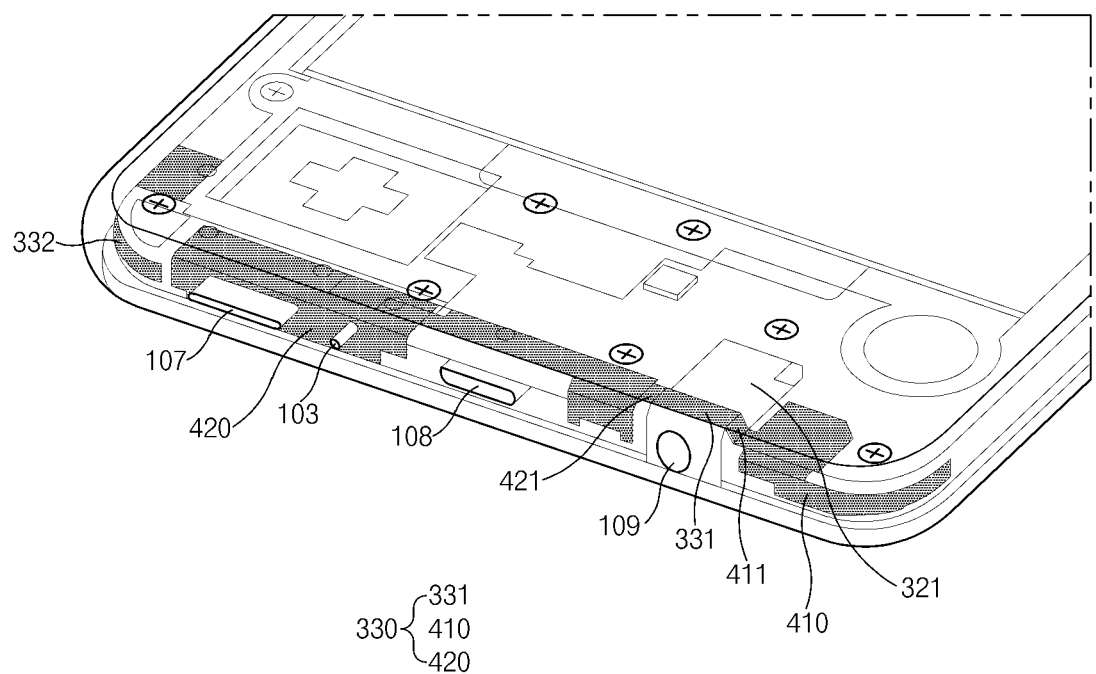
FIG. 11 is a projection perspective view illustrating a first antenna structure and a second antenna structure of an electronic device according to an embodiment.
Figure 12:
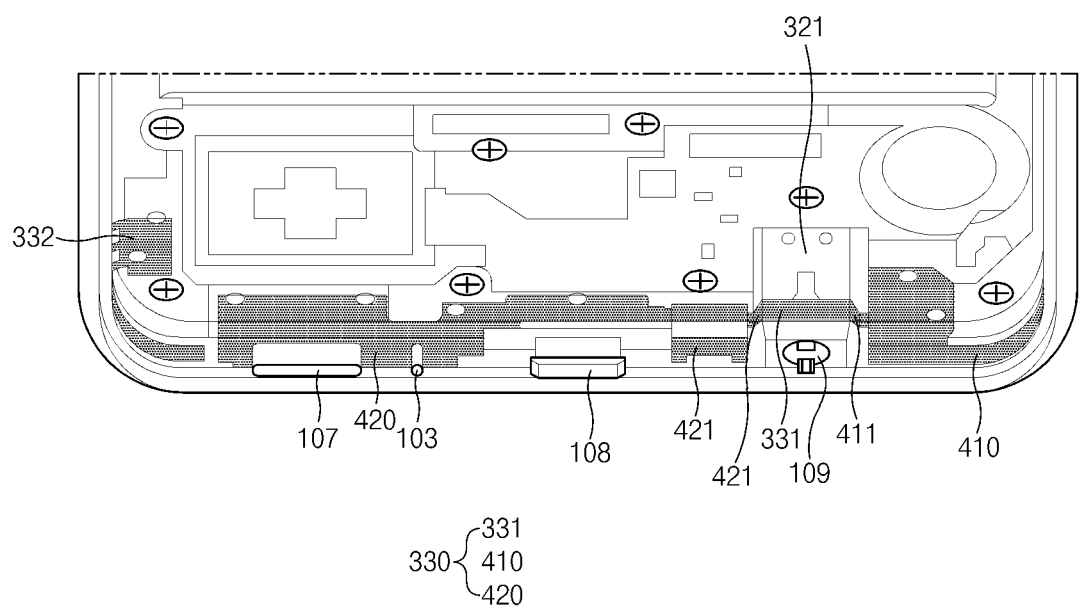
FIG. 12 is a projection rear view illustrating a first antenna structure and a second antenna structure of an electronic device according to an embodiment.
Figure 13:
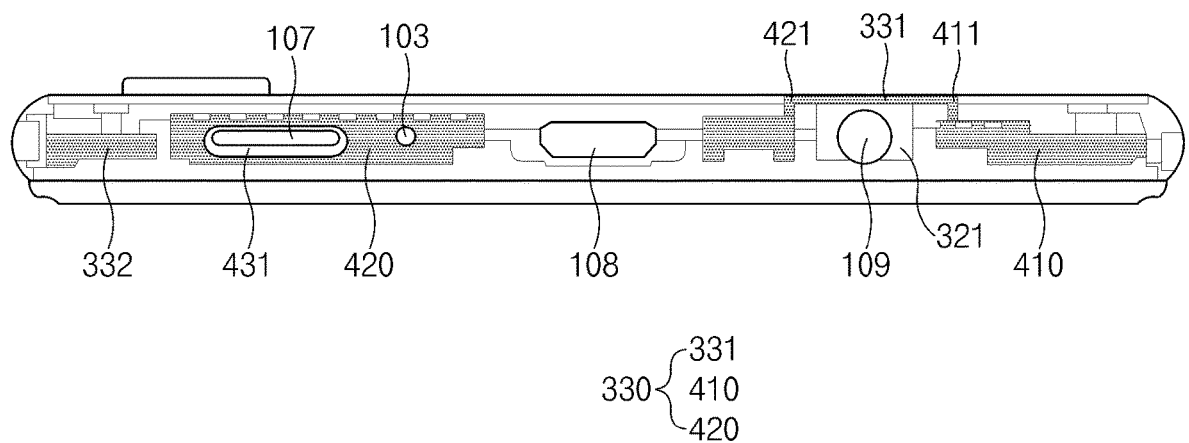
FIG. 13 is a projection side view illustrating a first antenna structure and a second antenna structure of an electronic device according to an embodiment.

FIG. 11 is a projection perspective view illustrating the first antenna structure 330 and the second antenna structure 332 of the electronic device 100 according to an embodiment. FIG. 12 is a projection rear view illustrating the first antenna structure 330 and the second antenna structure 332 of the electronic device 100 according to an embodiment. FIG. 13 is a projection side view illustrating the first antenna structure 330 and the second antenna structure 332 of the electronic device 100 according to an embodiment.

In an embodiment, the electronic device 100 may include at least one of the first antenna structure 330 and/or the second antenna structure 332. The first antenna structure 330 and/or the second antenna structure 332 may be disposed to be adjacent to at least part of an edge of the electronic device 100. The first antenna structure 330 and the second antenna structure 332 may be spaced from each other by a specified interval.

In an embodiment, the first antenna structure 330 may include the connection part 331. When viewed from above the back plate 350, the connection part 331 may be formed to cross the first component 321 (e.g., an ear jack).

In an embodiment, the first antenna structure 330 may include the first fixing part 411 and the second fixing part 421. The first fixing part 411 and the second fixing part 421 may be disposed at opposite ends of the connection part 331.

In an embodiment, the first antenna structure 330 may include the second portion 420. The second portion 420 may increase an electrical length of the first antenna structure 330.

In an embodiment, the second portion 420 may have the at least one hole structure 431. When viewed from above of the side surface of the rear structure 340, the at least one hole structure 431 may be disposed to overlap with at least one of the microphone hole 103, the speaker hole 107, and the connector holes 108 and 109. The microphone hole 103 may input a voice to the electronic device 100. The electronic device 100 may output a sound through the speaker hole 107.

In an embodiment, even though the at least one hole structure 431 is present inside the second portion 420, the second portion 420 may be disposed together with the microphone hole 103, the speaker hole 107, and the connector holes 108 and 109 by forming the second portion 420 at a periphery of the hole structure 431. The second portion 420 may be formed at a periphery of the components 321 to 324, which are disposed in the electronic device 100, such as the microphone hole 103, the speaker hole 107, and the connector holes 108 and 109, by arranging the hole structure 431 inside the second portion 420. Accordingly, the size of the electronic device 100 may be reduced by increasing the efficiency or integration of arrangement of the first antenna structure 330. Besides, when the first antenna structure 330 includes the second portion 420 as compared to a case where only the first portion 410 is included, the radiation performance is improved, thereby implementing an antenna having the performance of a specific level or higher.

According to various embodiments, the electronic device 100 may include the housing 110 including the front plate 102, the back plate 350 facing in an opposite direction of the front plate 102, and the rear structure 340 surrounding a space between the front plate 102 and the back plate 350 and including at least one opening 341, a display 310 viewable through at least part of the front plate 102 of the electronic device 100, the supporting member 320 interposed between the display 310 and the rear structure 340, the at least one component (321~324) interposed between the supporting member 320 and the rear structure 340 and at least partially overlapping with the opening 341 when viewed from above the back plate 350, the antenna structure 330 interposed between the supporting member 320 and the rear structure 340, and a wireless communication circuit 1390 electrically connected to at least one of the first conductive pattern 451 and/or the second conductive pattern 452 and transmitting and/or receiving a signal having a specified frequency. The antenna structure 330 may include the connection part 331 at least partially overlapping with the opening 341, interposed between the component (321~324) and the back plate 350, and including the first conductive pattern 451 and the first portion 410 connected to the connection part 331 and including the second conductive pattern 452 electrically connected to the first conductive pattern 451 when viewed from above the back plate 350.

In an embodiment, the antenna structure 330 may be formed of an FPCB.

In an embodiment, the back plate 350 may further include the reinforcement member 810 at least partially overlapping with the opening 341 and the connection part 331 and interposed between the back plate 350 and the connection part 331 when viewed from above the back plate 350.

In an embodiment, the antenna structure 330 may have the at least one hole structure 431.

In an embodiment, the antenna structure 330 may be disposed on a back surface of the rear structure 340 and on one inner side surface of the rear structure 340.

In an embodiment, the antenna structure 330 may further include the pattern connection part 412 connected to the PCB 510 on which the wireless communication circuit 1390 is disposed.

In an embodiment, the component (321~324) may include at least one of the ear jack 321, the speaker 322, the connector 323, the microphone 324, or the communication module 1390.

In an embodiment, the antenna structure 330 may include the third conductive pattern 453 electrically connected to the first conductive pattern 451 and may further include the second portion 420 extending along one side surface of the rear structure 340.

According to various embodiments, the electronic device 100 may include the one or more components (321~324) disposed, on the side surface 110C of the electronic device 100 or inside the electronic device 100, the rear structure 340 forming the side surface 110C and the back surface 110B of the electronic device 100 and mounting the components (321~324), the back plate 350 disposed outside the rear structure 340, the antenna structure 330 disposed inside the rear structure 340, the PCB 510 including at least one pattern connection part 511 or 512 connected to the antenna structure 330, and one or more processors 1320 operatively connected to the PCB 510. The rear structure 340 may have at least one opening 341 in a region overlapping with one component 321 of the one or more components (321~324) in a first direction. The antenna structure 330 may include the connection part 331 interposed between the one component 321 and the back plate 350 while crossing the at least one opening 341 in a second direction different from the first direction and radiates a signal of a specified frequency depending on an electrical length of the antenna structure 330 implemented by using the connection part 331.

In an embodiment, the connection part 331 may be formed of an FPCB having flexibility and may maintain an arched shape by the fixing parts 411 and 421 disposed at opposite ends of the connection part 331.

In an embodiment, the antenna structure 330 may have the at least one hole structure 431 in a region overlapping with the hole (103, 107~109) that the one or more components (321~324) have.

In an embodiment, the antenna structure 330 may be integrally disposed inside a back surface of the rear structure 340 and a side surface of the rear structure 340 by using an FPCB having flexibility.

In an embodiment, the antenna structure 330 may have the pattern connection part 412 connected to the PCB 510, may radiate a signal of a first frequency by using a first electrical path including the pattern connection part 412 and the first portion 410 of the antenna structure 330, and may radiate a signal of a second frequency by using a second electrical path including the pattern connection part 412, the second portion 420 of the antenna structure 330, and the connection part 331.

According to various embodiments, the electronic device 100 may include the one or more components (321~324) disposed, on the side surface 110C of the electronic device 100 or inside the electronic device 100, the rear structure 340 forming the side surface 110C and the back surface 110B of the electronic device 100 and mounting the one or more components (321~324), the back plate 350 disposed outside the rear structure 340, and the antenna structure 330 covering an internal lower surface and an internal side surface of the rear structure 340 and having the at least one hole structure 431 at a portion corresponding to the one or more components (321~324). The rear structure 340 may have the at least one opening 341 disposed adjacent to one component 321 among the one or more components (321~324). The antenna structure 330 may have the connection part 331 disposed to at least partially overlap with the opening 341 and the first portion 410 electrically connected to one side of the connection part 331.

In an embodiment, the connection part 331 may be formed of an FPCB, and the fixing parts 411 and 421 for maintaining a shape of the connection part may be disposed at opposite ends of the connection part 331.

In an embodiment, the antenna structure 330 may further include the second portion 420 connected to the other side of the connection part 331 and disposed in at least part of an edge region of one side of the rear structure 340.

In an embodiment, the antenna structure 330 may further include one or more pattern connection parts 412 connected to the PCB 510 and performing feeding or grounding.

Figure 14:
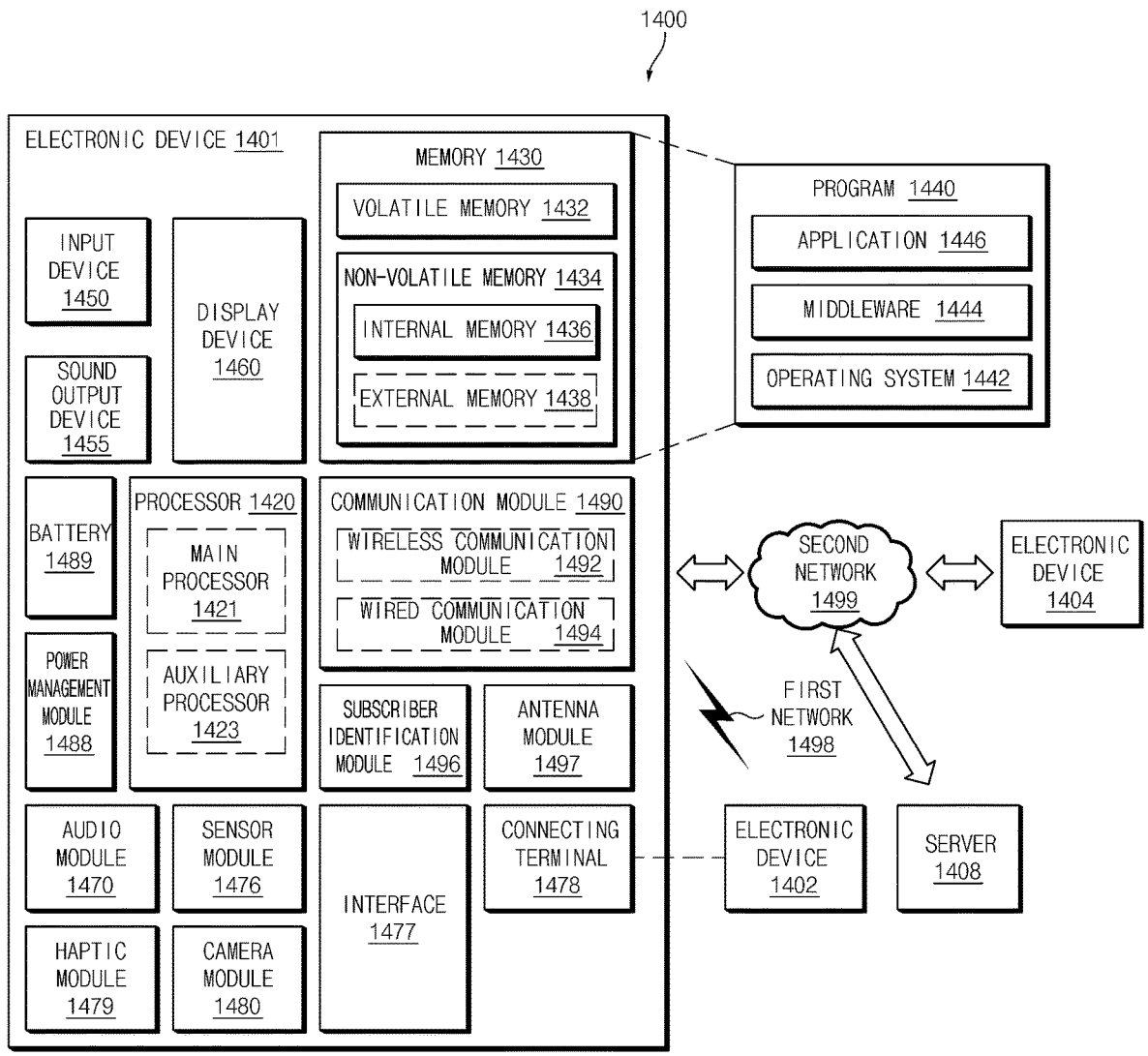
FIG. 14 is a block diagram illustrating an electronic device in a network environment according to various embodiments.

FIG. 14 is a block diagram illustrating an electronic device 1401 in a network environment 1400 according to various embodiments. Referring to FIG. 14, the electronic device 1401 in the network environment 1400 may communicate with an electronic device 1402 via a first network 1498 (e.g., a short-range wireless communication network), or an electronic device 1404 or a server 1408 via a second network 1499 (e.g., a long-range wireless communication network). According to an embodiment, the electronic device 1401 may communicate with the electronic device 1404 via the server 1408. According to an embodiment, the electronic device 1401 may include a processor 1420, memory 1430, an input device 1450, a sound output device 1455, a display device 1460, an audio module 1470, a sensor module 1476, an interface 1477, a haptic module 1479, a camera module 1480, a power management module 1488, a battery 1489, a communication module 1490, a subscriber identification module (SIM) 1496, or an antenna module 1497. In some embodiments, at least one (e.g., the display device 1460 or the camera module 1480) of the components may be omitted from the electronic device 1401, or one or more other components may be added in the electronic device 1401. In some embodiments, some of the components may be implemented as single integrated circuitry. For example, the sensor module 1476 (e.g., a fingerprint sensor, an iris sensor, or an illuminance sensor) may be implemented as embedded in the display device 1460 (e.g., a display).

The processor 1420 may execute, for example, software (e.g., a program 1440) to control at least one other component (e.g., a hardware or software component) of the electronic device 1401 coupled with the processor 1420, and may perform various data processing or computation. According to one embodiment, as at least part of the data processing or computation, the processor 1420 may load a command or data received from another component (e.g., the sensor module 1476 or the communication module 1490) in volatile memory 1432, process the command or the data stored in the volatile memory 1432, and store resulting data in non-volatile memory 1434. According to an embodiment, the processor 1420 may include a main processor 1421 (e.g., a central processing unit (CPU) or an application processor (AP)), and an auxiliary processor 1423 (e.g., a graphics processing unit (GPU), an image signal processor (ISP), a sensor hub processor, or a communication processor (CP)) that is operable independently from, or in conjunction with, the main processor 1421. Additionally or alternatively, the auxiliary processor 1423 may be adapted to consume less power than the main processor 1421, or to be specific to a specified function. The auxiliary processor 1423 may be implemented as separate from, or as part of the main processor 1421.

The auxiliary processor 1423 may control at least some of functions or states related to at least one component (e.g., the display device 1460, the sensor module 1476, or the communication module 1490) among the components of the electronic device 1401, instead of the main processor 1421 while the main processor 1421 is in an inactive (e.g., sleep) state, or together with the main processor 1421 while the main processor 1421 is in an active state (e.g., executing an application). According to an embodiment, the auxiliary processor 1423 (e.g., an image signal processor or a communication processor) may be implemented as part of another component (e.g., the camera module 1480 or the communication module 1490) functionally related to the auxiliary processor 1423.

The memory 1430 may store various data used by at least one component (e.g., the processor 1420 or the sensor module 1476) of the electronic device 1401. The various data may include, for example, software (e.g., the program 1440) and input data or output data for a command related thereto. The memory 1430 may include the volatile memory 1432 or the non-volatile memory 1434.

The program 1440 may be stored in the memory 1430 as software, and may include, for example, an operating system (OS) 1442, middleware 1444, or an application 1446.

The input device 1450 may receive a command or data to be used by other component (e.g., the processor 1420) of the electronic device 1401, from the outside (e.g., a user) of the electronic device 1401. The input device 1450 may include, for example, a microphone, a mouse, a keyboard, or a digital pen (e.g., a stylus pen).

The sound output device 1455 may output sound signals to the outside of the electronic device 1401. The sound output device 1455 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 1460 may visually provide information to the outside (e.g., a user) of the electronic device 1401. The display device 1460 may include, for example, a display, a hologram device, or a projector and control circuitry to control a corresponding one of the display, hologram device, and projector. According to an embodiment, the display device 1460 may include touch circuitry adapted to detect a touch, or sensor circuitry (e.g., a pressure sensor) adapted to measure the intensity of force incurred by the touch.

The audio module 1470 may convert a sound into an electrical signal and vice versa. According to an embodiment, the audio module 1470 may obtain the sound via the input device 1450, or output the sound via the sound output device 1455 or a headphone of an external electronic device (e.g., an electronic device 1402) directly (e.g., wiredly) or wirelessly coupled with the electronic device 1401.

The sensor module 1476 may detect an operational state (e.g., power or temperature) of the electronic device 1401 or an environmental state (e.g., a state of a user) external to the electronic device 1401, and then generate an electrical signal or data value corresponding to the detected state. According to an embodiment, the sensor module 1476 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1477 may support one or more specified protocols to be used for the electronic device 1401 to be coupled with the external electronic device (e.g., the electronic device 1402) directly (e.g., wiredly) or wirelessly. According to an embodiment, the interface 1477 may include, for example, a high definition multimedia interface (HDMI), a universal serial bus (USB) interface, a secure digital (SD) card interface, or an audio interface.

A connecting terminal 1478 may include a connector via which the electronic device 1401 may be physically connected with the external electronic device (e.g., the electronic device 1402). According to an embodiment, the connecting terminal 1478 may include, for example, a HDMI connector, a USB connector, a SD card connector, or an audio connector (e.g., a headphone connector).

The haptic module 1479 may convert an electrical signal into a mechanical stimulus (e.g., a vibration or a movement) or electrical stimulus which may be recognized by a user via his tactile sensation or kinesthetic sensation. According to an embodiment, the haptic module 1479 may include, for example, a motor, a piezoelectric element, or an electric stimulator.

The camera module 1480 may capture a still image or moving images. According to an embodiment, the camera module 1480 may include one or more lenses, image sensors, image signal processors, or flashes.

The power management module 1488 may manage power supplied to the electronic device 1401. According to one embodiment, the power management module 1488 may be implemented as at least part of, for example, a power management integrated circuit (PMIC).

The battery 1489 may supply power to at least one component of the electronic device 1401. According to an embodiment, the battery 1489 may include, for example, a primary cell which is not rechargeable, a secondary cell which is rechargeable, or a fuel cell.

The communication module 1490 may support establishing a direct (e.g., wired) communication channel or a wireless communication channel between the electronic device 1401 and the external electronic device (e.g., the electronic device 1402, the electronic device 1404, or the server 1408) and performing communication via the established communication channel. The communication module 1490 may include one or more communication processors that are operable independently from the processor 1420 (e.g., the application processor (AP)) and supports a direct (e.g., wired) communication or a wireless communication. According to an embodiment, the communication module 1490 may include a wireless communication module 1492 (e.g., a cellular communication module, a short-range wireless communication module, or a global navigation satellite system (GNSS) communication module) or a wired communication module 1494 (e.g., a local area network (LAN) communication module or a power line communication (PLC) module). A corresponding one of these communication modules may communicate with the external electronic device via the first network 1498 (e.g., a short-range communication network, such as Bluetooth™, wireless-fidelity (Wi-Fi) direct, or infrared data association (IrDA)) or the second network 1499 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1492 may identify and authenticate the electronic device 1401 in a communication network, such as the first network 1498 or the second network 1499, using subscriber information (e.g., international mobile subscriber identity (IMSI)) stored in the subscriber identification module 1496.

The antenna module 1497 may transmit or receive a signal or power to or from the outside (e.g., the external electronic device) of the electronic device 1401. According to an embodiment, the antenna module 1497 may include an antenna including a radiating element composed of a conductive material or a conductive pattern formed in or on a substrate (e.g., PCB). According to an embodiment, the antenna module 1497 may include a plurality of antennas. In such a case, at least one antenna appropriate for a communication scheme used in the communication network, such as the first network 1498 or the second network 1499, may be selected, for example, by the communication module 1490 (e.g., the wireless communication module 1492) from the plurality of antennas. The signal or the power may then be transmitted or received between the communication module 1490 and the external electronic device via the selected at least one antenna. According to an embodiment, another component (e.g., a radio frequency integrated circuit (RFIC)) other than the radiating element may be additionally formed as part of the antenna module 1497.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1401 and the external electronic device 1404 via the server 1408 coupled with the second network 1499. Each of the electronic devices 1402 and 1404 may be a device of a same type as, or a different type, from the electronic device 1401. According to an embodiment, all or some of operations to be executed at the electronic device 1401 may be executed at one or more of the external electronic devices 1402, 1404, or 1408. For example, if the electronic device 1401 should perform a function or a service automatically, or in response to a request from a user or another device, the electronic device 1401, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1401. The electronic device 1401 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1440) including one or more instructions that are stored in a storage medium (e.g., internal memory 1436 or external memory 1438) that is readable by a machine (e.g., the electronic device 1401). For example, a processor (e.g., the processor 1420) of the machine (e.g., the electronic device 1401) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
   a housing including a front plate, a back plate facing in an opposite direction of the front plate, and a rear structure surrounding a space between the front plate and the back plate and including at least one opening;
   a display viewable through at least part of the front plate of the electronic device;
   a supporting member interposed between the display and the rear structure;
   at least one component interposed between the supporting member and the rear structure and at least partially overlapping with the opening when viewed from above the back plate;
   an antenna structure interposed between the supporting member and the rear structure, wherein the antenna structure includes:
      when viewed from above the back plate, a connection part at least partially overlapping with the opening, interposed between the component and the back plate, and including a first conductive pattern; and
      a first portion connected to the connection part and including a second conductive pattern electrically connected to the first conductive pattern; and
   a wireless communication circuit electrically connected to at least one of the first conductive pattern and/or the second conductive pattern and configured to transmit and/or receive a signal having a specified frequency.

2. The electronic device of claim 1, wherein the antenna structure is formed of a flexible printed circuit board (FPCB).

3. The electronic device of claim 1, wherein the back plate further includes:
   when viewed from above the back plate, a reinforcement member at least partially overlapping with the opening and the connection part and interposed between the back plate and the connection part.

4. The electronic device of claim 1, wherein the antenna structure has at least one hole structure.

5. The electronic device of claim 1, wherein the antenna structure is disposed on a back surface of the rear structure and on one inner side surface of the rear structure.

6. The electronic device of claim 1, wherein the antenna structure further includes:
   a pattern connection part connected to a printed circuit board (PCB) on which the wireless communication circuit is disposed.

7. The electronic device of claim 1, wherein the component includes at least one of an ear jack, a speaker, a connector, a microphone, or a communication module.

8. The electronic device of claim 1, wherein the antenna structure includes a third conductive pattern electrically connected to the first conductive pattern and further includes a second portion extending along one side surface of the rear structure.

9. An electronic device comprising:
   one or more components disposed, on a side surface of the electronic device or inside the electronic device;
   a rear structure forming the side surface and a back surface of the electronic device and mounting the one of more components;
   a back plate disposed outside the rear structure;
   an antenna structure disposed inside the rear structure;
   a PCB including at least one pattern connection part connected to the antenna structure; and
   one or more processors operatively connected to the PCB,
   wherein the rear structure has at least one opening in a region overlapping with one component of the one or more components in a first direction, and
   wherein the antenna structure includes a connection part interposed between the one component and the back plate while crossing the at least one opening in a second direction different from the first direction and radiates a signal of a specified frequency depending on an electrical length of the antenna structure implemented by using the connection part.

10. The electronic device of claim 9, wherein the connection part is formed of an FPCB having flexibility and maintains an arched shape by fixing parts disposed at opposite ends of the connection part.

11. The electronic device of claim 9, wherein the back plate further includes:
   when viewed from above the back plate, a reinforcement member at least partially overlapping with the opening and the connection part and interposed between the back plate and the connection part.

12. The electronic device of claim 9, wherein the antenna structure has at least one hole structure in a region overlapping with a hole that the one or more components have.

13. The electronic device of claim 9, wherein the antenna structure is integrally disposed inside a back surface of the rear structure and a side surface of the rear structure by using an FPCB having flexibility.

14. The electronic device of claim 9, wherein the antenna structure has a pattern connection part connected to the PCB, radiates a signal of a first frequency by using a first electrical path including the pattern connection part and a first portion of the antenna structure, and radiates a signal of a second frequency by using a second electrical path including the pattern connection part, a second portion of the antenna structure, and the connection part.

15. The electronic device of claim 9, wherein the one or more components include at least one of an ear jack, a speaker, a connector, a microphone, or a communication module.

* * * * *